United States Patent [19]

Bergacker et al.

[11] Patent Number: 4,729,538
[45] Date of Patent: Mar. 8, 1988

[54] APPARATUS FOR HYDRAULICALLY ACTUATING A VEHICLE SEAT

[76] Inventors: John W. Bergacker, 1009 NE. 104 St., Miami Shores, Fla. 33138; Thomas H. Milbauer, Rte. 2; Donald G. Parks, P.O. Box 91, 320 Siegert St., both of, Marion, Wis. 54950

[21] Appl. No.: 929,098
[22] Filed: Nov. 10, 1986
[51] Int. Cl.$^4$ .............................................. F16M 13/00
[52] U.S. Cl. .................................... 248/550; 248/562; 296/65 R
[58] Field of Search ............... 248/550, 566, 568, 595, 248/562; 280/6 R, 6.11; 296/63, 65 R; 297/345; 180/41, 282, 313

[56] References Cited

U.S. PATENT DOCUMENTS

| | | | |
|---|---|---|---|
| 3,288,523 | 11/1966 | Bollden et al. | 296/65 R |
| 3,328,019 | 6/1967 | Wilson | 280/6 R X |
| 4,090,580 | 5/1978 | McLennan | 296/65 R X |
| 4,363,377 | 12/1982 | Van Gerpen | 248/550 |

Primary Examiner—J. Franklin Foss
Attorney, Agent, or Firm—Isaksen, Lathrop, Esch, Hart & Clark

[57] ABSTRACT

The present invention provides simple and effective mechanisms, apparatus and self contained fluid circuitry to hydraulically actuate the vehicle's seat in generally downward movement in response to general upward movement of the vehicle's terrain contacting apparatus in relation to the vehicle's main body mass. The present invention also includes a simple device to remotely adjust and control the response movement of a hydraulic seat actuator. Also included in the invention is a means of controlling the actions of one or more hydraulic double acting piston pumps.

11 Claims, 2 Drawing Figures

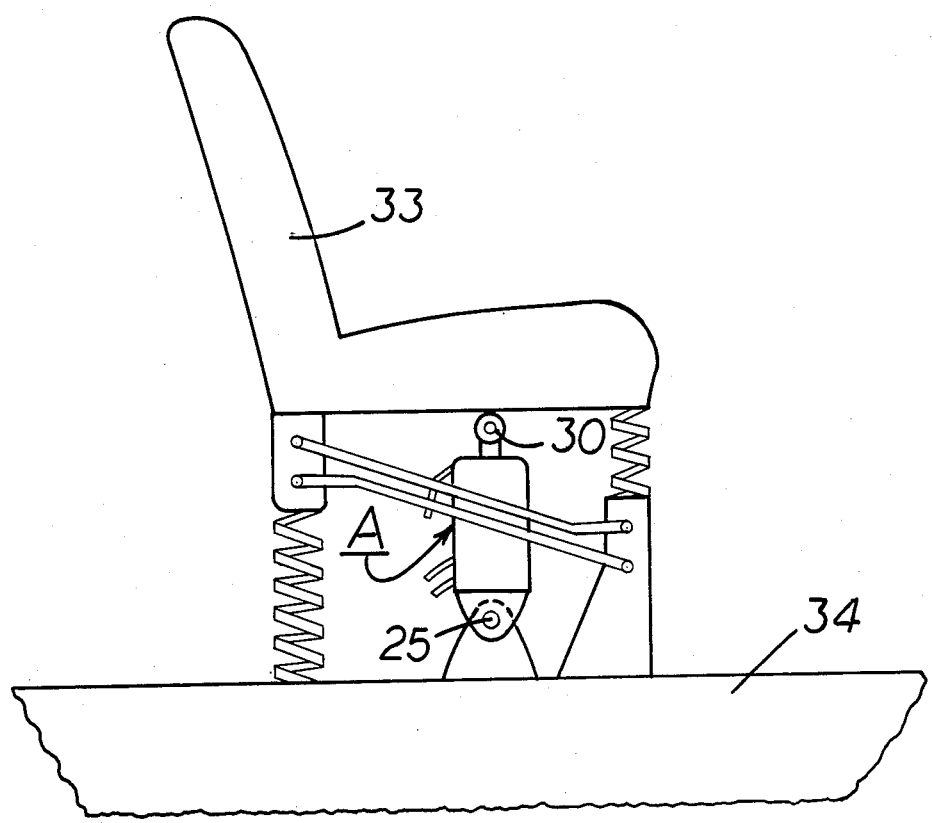
Fig_1_

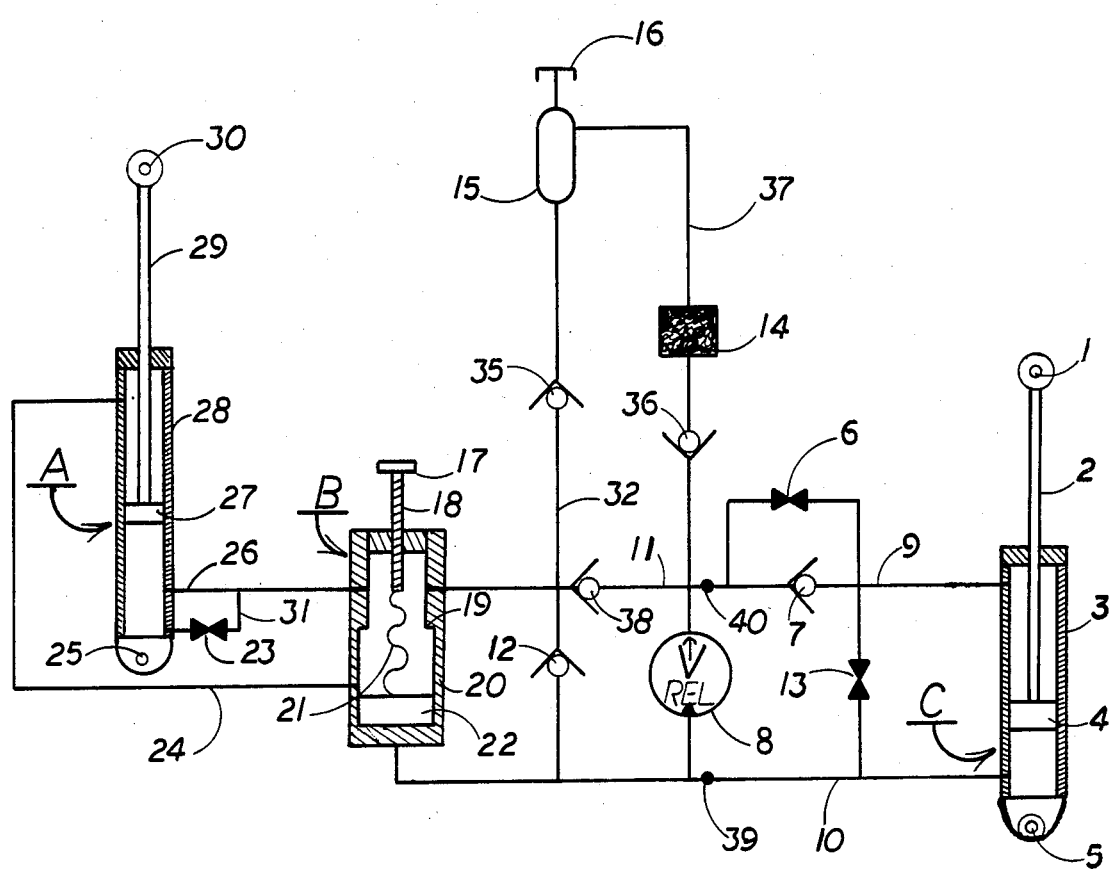
Fig_2_

4,729,538

APPARATUS FOR HYDRAULICALLY ACTUATING A VEHICLE SEAT

BACKGROUND OF THE INVENTION

The present invention is directed toward providing an apparatus which may be adapted for use with a large variety of vehicles and vehicle seats to actuate a vehicle seat. More particularly, the invention is directed toward a hydraulic system and assembly that will move a vehicle seat downward when the vehicle's terrain contacting apparatus moves upward to better isolate the vehicle rider(s) from oscillatory movements in the vertical direction caused by the vehicle operating on other than smooth terrain.

The prior art provides numerous examples of interconnecting linkages and resilient mounts for supporting a seat to a vehicle to isolate a rider from various forms of vertical motion. In spite of these linkages and mounts a rider still can have a bouncy or jolting ride due to the vehicle traversing rough terrain. This is primarily caused by a rapid upward movement of the seat in response to a rapid upward movement of the vehicle terrain contacting apparatus via the vehicle main body mass. The present invention tends to prevent the seat from moving in the same direction by causing the seat to be moved a similar distance in the opposite direction; thereby, preventing the seat rider from feeling movement in the seat to the extent the rider normally would without the present invention.

The present invention is particularly concerned with being used in conjunction with existing seat suspension systems to provide a better ride to the vehicle seat occupant(s).

SUMMARY OF THE INVENTION

It is accordingly the primary object of the invention to provide a self-contained hydraulic system to actuate a vehicle seat having outside power or energy source is involved other than that produced by movement of the vehicle terrain contacting apparatus.

It is also an object of the invention to provide a method and apparatus to detect and hydraulically communicate movement of a vehicle's terrain contacting apparatus in the direction of the vehicle's main body mass to a device to move a vehicle seat in the direction of the vehicle seat's support structure. it is another object of the invention to provide control and regulation of hydraulic fluid to and from a hydraulic seat actuator.

It is a further object of the invention to provide a system of controlling piston movement of a hydraulic response actuator (double acting piston pump) by controlling the fluid of the hydraulic response actuator. The hydraulic response actuator is attached to the vehicle's terrain contacting apparatus, running gear or suspension system and to the vehicle's main body mass to detect relative movement between the vehicle's terrain contacting apparatus and its main body mass and to transmit fluid.

It is a still further object of the invention to provide a system of filtering the fluid within the system.

Additional objects and advantages of the present invention are made apparent below having reference to the accompanying drawings.

DESCRIPTION OF THE DRAWINGS

FIG. 1 is a side view in elevation of a vehicle seat resiliently mounted upon a suitable vehicle support structure including a portion of the present invention used to actuate the seat.

FIG. 2 is a schematic of the present invention consisting of fluid circuits and components in section.

DESCRIPTION OF THE PREFERRED EMBODIMENT

A hydraulic system and assembly constructed according to the present invention for use with various vehicles and seats is described below with reference to FIG. 1 and FIG. 2.

Referring to FIG. 1, a hydraulic seat actuator $\underline{A}$ is pivotably connected to a resiliently mounted vehicle seat 33 at 30 and to a suitable vehicle seat support structure 34 by pivotal connection 25. Hydraulic seat actuator $\underline{A}$ may be used to supplement or replace most hydraulic shock absorbers which may be a part of any vehicle seat assembly. Seat 33 can be any vehicle seat having a back or no back or having an arm rest or no arm rest. Seat 33 must be resiliently mounted but not necessarily as shown in FIG. 1. Vehicle seat support structure 34 may be of any configuration depending on the vehicle and not necessarily as shown in FIG. 1. It is not believed necessary to illustrate any other portion of the vehicle except to note that the vehicle seat support structure 34 can be a portion of any vehicle.

The present invention is a system having a fluid circuit including hydraulic components as illustrated in FIG. 2 and described as follows: a hydraulic seat actuator $\underline{A}$, a hydraulic response controller $\underline{B}$ and a hydraulic response actuator $\underline{C}$.

The hydraulic response actuator $\underline{C}$ is connected to a vehicle's main body mass (not shown) by a pivotal connection at 1 and to a part of a vehicle's suspension system, running gear or terrain contacting apparatus (not shown) by a pivotal connection at 5. When the vehicle's suspension system, running gear or terrain contacting apparatus moves relatively toward the vehicle's main body mass, fluid is pumped from the hydraulic response actuator $\underline{C}$ primarily to the hydraulic response controller $\underline{B}$, which may allow some fluid to enter the top of the cylinder 28 of the hydraulic seat actuator $\underline{A}$, which actuates a connected vehicle seat toward the vehicle seat's support structure. When the vehicle's terrain contacting apparatus moves downward relatively away from the vehicle's main body mass, the hydraulic seat actuator does not actuate the vehicle's seat.

The present invention fluid circuit as illustrated in FIG. 2 is described hereafter as particularly including hydraulic components. However, within the scope of the present invention, the circuit and components might also be adapted for use with other fluids such as pneumatic.

The circuit includes a hydraulic response actuator $\underline{C}$ which consists of a cylinder 3 within which a piston 4 is moveable in correlation with relative motion between the main body mass (not shown) connected at 1 and a part of the vehicle terrain contacting apparatus, suspension system or running gear (not shown) connected at 5. The piston 4 may be penetrated by restrictive orifices including relief valve(s).

An upward movement of connection 5 causes movement of the piston 4 toward the head end of the cylinder 3 while downward movement of connection 5 conversely moves the piston toward the rod end of the cylinder 3. The circuit illustrated in FIG. 2 also includes a conduit 10, which communicates with the head end of the cylinder 3, a restrictive orifice 13, a pressure relief valve 8, a one way check valve 12, and a hydraulic response controller B. Another conduit 9 communicates with the rod end of the cylinder 3, a one way check valve 7, a parallel restrictive orifice 6, and restrictive orifice 13. Still another conduit 11 communicates with a one way check valve 7, a parallel restrictive orifice 6, a relief valve 8, a one way check valve 12, a branch conduit 37, a branch conduit 32, a hydraulic response controller B, and a one way check valve 38 included in conduit 11 between the connection points of branch conduit 37 and branch 32 with conduit 11. The conduit 11 may communicate with the hydraulic response controller B via communication with the conduit 26 rather than directly as shown in FIG. 2.

A fluid reservoir 15 of convention design with filler cap 16 is communicated by means of a branch conduit 32 with the conduit 11 at a point between the hydraulic response controller B or the conduit 11 communication (not shown) with the conduit 26 and one way check valve 38. The branch conduit 32 includes a one way check valve 35 arranged in series between the conduit 11 and the fluid reservoir 15. The fluid reservoir 15 is also communicated by means of a branch conduit 37 with conduit 11 at a point between the one way check valve 38 and the parallel arrangement of the one way check valve 7 and restrictive orifice 6. The conduit 9 includes a one-way check valve 7 and restrictive orifice 6. The conduit 37 includes a one-way check valve 36 and a filter 14 arranged in series, with filter 14 between the fluid reservoir 15 and the one way check valve 36. The filter 14, the one way check valves 35, 36, 38 and branch conduit 37 are only required when the system fluid is filtered. The system will work without filtering.

The circuit also includes a hydraulic response controller B which consists of cylinder 20 within which a piston or slug 22 is moveable by fluid from the conduit 10 which communicates through the head end of the cylinder 20 to the area between the head end of the cylinder 20 and the piston 22. The movement of the piston 22 in the direction away from the head end of the cylinder 20 is resisted by a resilient element 21, such as a spring, which can have its relative resistance changed. Changes in resistance may be desirable due to changes in terrain, vehicle operation or vehicle's mechanical apparatus. A stem 18 having an appropriate handle 17 is one means to do so. The stem 18 may be rising (shown) or nonrising (not shown) stem. Changes in resistance of the resilient element 21 can be made remotely by systems that are not a part of the present invention. The movement of the piston 22 in the direction away from the head end of the cylinder 20 is restricted by a restraint 19 located a distance sufficient to allow the piston 22 contact area with the wall of the cylinder 20 to pass beyond the communicating orifice of conduit 24 with the cylinder 20 so as to allow the fluid from conduit 10 to communicate with conduit 24 via cylinder 20. The piston 22 may have other shapes than that shown in FIG. 2 such as a sphere, frustrum of a cone, parabolic segment, ellipsoid, etc. The communicating orifice of the conduit 24 with the cylinder 20 is located a distance from the head end of cylinder 20 sufficient to allow fluid communication with the cylinder 20 above the piston 22, when the piston 22 is located at the head end of the cylinder 20.

Conduit 24 communicates the rod end of cylinder 28 of a hydraulic seat actuator A with the cylinder 20 of hydraulic response controller B. Another conduit 26 communicates the head end of cylinder 28 of the hydraulic seat actuator A with the stem end of cylinder 20 directly or via a connection (not shown) with the conduit 11. Another branch conduit 31 is also in communication with the cylinder 28, closely adjacent to or at its head end, and the conduit 26. The conduit 31 includes another restrictive orifice 23. The distance between the centers of opening of the conduits 26 and 31 through the cylinder 28 wall are at least equal to the contact thickness of the piston 27 with the cylinder 28 wall measured parallel with the rod 29. When the top of the piston 27 proceeds toward the head end of the cylinder 28 and while passing the conduit 26 opening to the cylinder 28 relieves the fluid pressure on the rod 29 side of the piston 27 via the conduit 26 thereby preventing further hydraulic force to piston 27 progression toward the head end of the cylinder 28.

The circuit also includes a hydraulic seat actuator A partially described previously, which consists of cylinder 28 within which a piston 27 is moveable, the piston 27 has a rod 29 which penetrates the rod end of the cylinder 28 and is pivotally connected at 30 to the vehicle's resiliently mounted seat 33 of conventional design as indicated in FIG. 1 and the head end of the cylinder 28 is pivotally connected at 25 to the vehicle support structure 34 of the main body mass as indicated in FIG. 1.

The vehicle seat 33 as indicated in FIG. 1 is unrestricted in movement by the hydraulic seat actuator A when no fluid is being communicated to the actuator A from the controller B through the conduit 24. This occurs when the vehicle's terrain contacting apparatus is not moving toward the vehicle's main body mass, or when the piston 22 is at or very near the head end of the cylinder 20. This condition is illustrated in FIG. 2.

The hydraulic response controller B, in combination with the one way relief valve 8 and the restrictive orifice 13, control and influence the amount of fluid communicated to the rod end of the cylinder 28 from the head end of the cylinder 3 via the conduits 10 and 24 including the hydraulic response controller B. The restrictive orifice 13 may be one hundred percent restrictive and totally closed when the vehicle is used over certain terrains or for other reasons. The one way relief valve 8 provides relief from undesirable pressure surges of fluid in the conduit 10 by passing some fluid at these times from the conduit 10 to conduit 11. Basically the pressure in the conduit 10 is always equal to or more than the pressure in the conduit 11. In the event fluid is passed through the relief valve 8 or the restrictive orifice 13, it is transmitted eventually by the conduit 9 to the rod end of the cylinder 3 and perhaps to the fluid reservoir 15 via the conduit 37 or the conduit 32 when the filter 14, the check valves 35, 36, and 38, and the conduit 37 are not part of the circuit.

The vehicle seat 33 as indicated in FIG. 1 is moved in the direction of the vehicle's support structure 34 by the actuator A when fluid is being communicated to it by the response actuator C via the conduits 10, 24 and the response controller B. This occurs when the vehicle's terrain contacting apparatus is moving toward the vehicle's main body mass sufficiently to cause the piston 4 to move sufficiently toward the head end of the cylinder 3 forcing fluid from the cylinder 3 via the conduit 10 to the head end of the cylinder 20 causing the piston 22 contact area with the wall of the cylinder 20 to pass beyond the communicating orifice of the conduit 24 with the cylinder 20 thus allowing the fluid from the conduit 10 to communicate with the conduit 24, via the orifice just mentioned. Fluid is then transmitted through the conduit 24 to the inside of the rod end of the cylinder 28 causing the piston 27, the rod 29, and the pivotal connector 30 of the seat actuator A to move in the direction of the pivotal connector 25. With the vehicle seat 33 connected at 30 and the vehicle support structure connected at 25 of the seat actuator A as shown in FIG. 1, the vehicle seat 33 will move in the direction of the vehicle support structure 34 when conditions are as described in this paragraph.

The rate of acceleration of the vehicle's terrain contacting apparatus away from the vehicle's main body mass can be controlled by operating, including remotely, the restrictiveness of the orifices 6 and 13 to fluid flow from the cylinder 3 via the conduit 9. This restricts the rate of acceleration of the pivotal connection 1 away from the pivotal connection 5. Proper adjustments of the restrictive orifices 6 and 13 for different terrains being traversed by the vehicle and different vehicle mechanical variations will afford the vehicle rider(s) a smoother ride. More than one hydraulic response actuator C may be used with the system provided they are connected at points 39 and 40 on conduits 10 and 9 respectively by similar systems and components as shown in FIG. 2 to the right of points 39 and 40.

In the embodiment of FIG. 2 numerous modifications may be made within the scope of the present invention. In particular, the hydraulic response controller B including portions of its connected conduits, check valves 12, 35, 36, and 38, a relief valve 8, and portions of the conduits connecting the check valves and relief valve could also be formed by including them within a single housing wherein the housing itself becomes an integral part of the components.

We claim:

1. A hydraulic suspension system for regulating movement of a vehicular seat in response to vertical travel of the vehicular body mass, comprising:
   (a) a hydraulic seat actuator comprising a first flexible coupling between the vehicular seat and the vehicular body mass, wherein the hydraulic seat actuator comprises a first piston reciprocally arranged within a first hydraulic cylinder and separating the first hydraulic cylinder into an upper portion and a lower portion, the first piston being adapted to move within the first cylinder in response to the relative movement of the vehicular body mass in relation to the vehicular seat;
   (b) a hydraulic response controller comprising a second piston reciprocally arranged within a second hydraulic cylinder and separating the second hydraulic cylinder into an upper portion and a lower portion, the hydraulic response controller being adapted to control and regulate the amount of fluid to and from the first hydraulic cylinder; and
   (c) a hydraulic response actuator comprising a second flexible coupling between the vehicular body mass and the vehicle suspension system, running gear, or terrain contacting apparatus, wherein the hydraulic response actuator comprises a third piston reciprocally arranged within a third hydraulic cylinder and separating the third hydraulic cylinder into an upper portion and a lower portion, the third piston being adapted to move within the third cylinder in response to the relative movement between the vehicular body mass and the vehicle suspension system, running gear or the terrain contacting apparatus; and
   (d) a source of fluid under pressure, wherein the fluid is in communication with the hydraulic seat actuator, the hydraulic response controller, the hydraulic response actuator, and a fluid reservoir.

2. The suspension system according to claim 1 wherein the suspension system comprises at least one check valve for restricting fluid flow from the lower portion of the third cylinder to the fluid reservoir.

3. The suspension system according to claim 1 wherein the suspension system comprises at least one check valve for restricting fluid flow from the lower portion of the third cylinder to the upper portion of the second cylinder.

4. The suspension system according to claim 1 wherein the suspension system comprises at least one check valve for restricting fluid flow from the lower portion of the third cylinder to the lower portion of the first cylinder.

5. The suspension system according to claim 1 further comprising a restrictive orifice for restricting fluid flow to the upper and lower portions of the third cylinder.

6. The suspension system according to claim 1 further comprising a pressure relief valve to relieve undesirable high fluid pressure in the lower portion of the third cylinder to the upper portion of the third cylinder and to relieve undesirable fluid pressure from the hydraulic response actuator to the fluid reservoir.

7. The suspension system according to claim 1 further comprising a fluid filter to filter all fluid to the fluid reservoir.

8. The suspension system according to claim 7 comprising a check valve to allow fluid to flow one way to the fluid filter and from the fluid filter to the fluid reservoir.

9. The suspension system according to claim 1 wherein the second cylinder of the hydraulic response controller has a large bore and a small bore, the second piston being slidably placed in the large bore, wherein the second piston includes a resilient resistance mechanism connected to the side of the piston facing the small bore.

10. The suspension system according to claim 9 wherein the resistance of the resilient resistance mechanism is variable.

11. The suspension system according to claim 10 further comprising means to remotely vary the resistence of the resilient resistance mechanism.

* * * * *